US012612326B2

(12) United States Patent (10) Patent No.: US 12,612,326 B2
Sackl (45) Date of Patent: Apr. 28, 2026

(54) METHOD AND DEVICE FOR PRODUCING PIECE GOODS

(71) Applicant: SAB Sondermaschinen- und Anlagen-Bau GmbH, Deutschlandsberg (AT)

(72) Inventor: Stefan Sackl, Bad Schwanberg (AT)

(73) Assignee: SAB Sondermaschinen- und Anlagen-Bau GmbH, Deutschlandsberg (AT)

( * ) Notice: Subject to any disclaimer, the term of this patent is extended or adjusted under 35 U.S.C. 154(b) by 306 days.

(21) Appl. No.: 18/039,506

(22) PCT Filed: Nov. 9, 2021

(86) PCT No.: PCT/EP2021/081147
§ 371 (c)(1),
(2) Date: May 31, 2023

(87) PCT Pub. No.: WO2022/117297
PCT Pub. Date: Jun. 9, 2022

(65) Prior Publication Data
US 2023/0416136 A1 Dec. 28, 2023

(30) Foreign Application Priority Data
Dec. 1, 2020 (EP) ..................................... 20210936

(51) Int. Cl.
*C03B 19/12* (2006.01)
*C03B 19/10* (2006.01)
*C03C 12/00* (2006.01)
(52) U.S. Cl.
CPC .......... *C03B 19/12* (2013.01); *C03B 19/1005* (2013.01); *C03C 12/00* (2013.01)

(58) Field of Classification Search
None
See application file for complete search history.

(56) References Cited

U.S. PATENT DOCUMENTS

RE30,569 E * 4/1981 Callahan .................... B01J 2/04
502/8
4,318,727 A * 3/1982 Pietsch ................. C03C 11/007
65/22
2017/0327412 A1 11/2017 Weinberger et al.

FOREIGN PATENT DOCUMENTS

CN 106698891 A * 5/2017 .............. C03B 1/02
GB 2565261 A 2/2019
(Continued)

OTHER PUBLICATIONS

JP-2001002442-A Clarivate Analytics Machine Translation retrieved May 29, 2025. (Year: 2025).*
(Continued)

*Primary Examiner* — Lisa L Herring
(74) *Attorney, Agent, or Firm* — GREENBLUM & BERNSTEIN, P.L.C.

(57) ABSTRACT
A method and device for producing piece goods. In order to enable a simple and cost-effective production of piece goods, which have a compact and stable nature and can be admixed to a glass melt in particular during glass production, liquid water glass is mixed with at least one silicate-based solid component, in particular glass powder, to form a mass and is applied in a planar manner to a working surface, whereupon the mass is divided and heated to a temperature below a glass transition temperature, so that piece goods are obtained, in particular one or more dimensionally stable pellets.

13 Claims, 4 Drawing Sheets

(56)         References Cited

FOREIGN PATENT DOCUMENTS

JP          H09314531  A  *  12/1997
JP          2001002442  A  *  1/2001   .........  C03B 19/1005

OTHER PUBLICATIONS

CN-106698891-A EPO Machine Translation retrieved Aug. 18, 2025. (Year: 2025).*

JP-H09314531-A EPO Machine Translation retrieved Aug. 19, 2025. (Year: 2025).*

International Search Report issued in International Patent Application No. PCT/EP2021/081147, dated Feb. 22, 2022, along with an English translation thereof.

Written Opinion of the International Searching Authority issued in International Patent Application No. PCT/EP2021/081147, dated Feb. 22, 2022.

* cited by examiner

METHOD AND DEVICE FOR PRODUCING PIECE GOODS

The invention relates to a method for producing piece goods.

The invention furthermore relates to a device for producing piece goods.

From the prior art, different methods for producing piece goods are known, which methods use silicate-based solids as starting material. In order to be able to produce piece goods, pellets, or granulates from the starting materials, the silicate-based solids are commonly mixed with other components, which in particular comprise alumina as well as various alkaline oxides and alkaline earth oxides. To facilitate shaping, the mixture obtained is often mixed with water, so that a dough-like mass is obtained that is easier to shape. Disc pelletizers or pellet presses with correspondingly shaped rollers are usually used for shaping. As a rule, these are made of steel, wherein, on the one hand, the abrasive effect of the silicate-based components of the mass results in a high wear of the shaping parts and, on the other hand, piece goods are obtained which have a brittle or friable nature. Piece goods obtainable in methods of this type have thus not proven suitable for being admixed to a glass melt in the course of glass production, for example, especially since the glass melt froths up when piece goods of this type are admixed.

Accordingly, the object of the invention can be seen in that a method of the type named at the outset is specified which avoids the above disadvantages and enables a simple and cost-effective production of piece goods that, in particular, can be admixed to a glass melt during glass production.

Additionally, an object of the invention is to specify a device for producing piece goods.

The first object is attained according to the invention in that liquid water glass is mixed with at least one silicate-based solid component, in particular glass powder, to form a mass and is applied in a planar manner to a working surface, whereupon the mass is divided and heated to a temperature below a glass transition temperature so that piece goods are obtained, in particular one or more dimensionally stable pellets.

According to the invention, the advantage thus results that dense piece goods are obtained which, when added to a glass melt, prevent a frothing of the melt, as is the case with glass powder or friable piece goods. Piece goods can thereby be sized such that they can be referred to as pellets, plates, or sheets. Additionally, they can be produced independently of a particle size of the glass powder, whereby all kinds of glass waste can be reused. Here, glass powder or ground glass accumulating in glass recycling can be mixed with other powder-form glass waste, and can be processed as a silicate-based solid into piece goods in a method according to the invention. Alternatively, glass waste accumulating in a recycling plant can also be ground in order to obtain glass powder.

A silicate-based solid component is considered to be all compounds, the structures of which contain at least one silicate tetrahedron. Here, a silicate tetrahedron is composed of a silicon atom that is surrounded by four oxygen atoms in a tetrahedral arrangement.

In addition, the use of liquid water glass according to the invention results in the advantage that no water needs to be added in the mixing process in order to obtain a dough-like consistency of the mass, even though this is possible. Since a dissolving process of solid alkali silicates in water normally requires increased temperatures and high pressures, the liquid aggregate state of the water glass is used to the effect that a simple mixing of the components takes place, which mixing would not be possible to the same extent in a mere mixing of the starting materials with water. Accordingly, the mixing of the at least one silicate-based solid component and the liquid water glass can easily and efficiently take place in a mixing unit, wherein the water glass produces a binding between individual solid components and thus serves as a binding agent.

According to the invention, the mass obtained, a suspension of at least one silicate-based solid component and liquid water glass is applied in a planar manner to a working surface. Here, an application unit can be used which enables the planar application of the mass, so that a particularly large throughput can be achieved and, at the same time, a particularly large quantity of piece goods can be produced. Chronologically separating the application to the working surface from the shaping of the mass also offers the advantage that the wear of the individual parts is significantly reduced. If the working surface is embodied to be movable, for example as a belt conveyor, and the method is designed as a continuous process, the mass can be constantly applied to the working surface, and a consistent quality of the piece goods can be guaranteed.

It can also be provided that the application unit is arranged to be directly adjacent to the mixing unit, in particular is consolidated with the mixing unit in a combined installation.

It can furthermore be provided that the application unit can be moved relative to the working surface, in particular transversely to a process direction and/or pivotably about a pivot axis arranged perpendicularly to a process direction or perpendicularly to a conveying direction of a belt conveyor, in order to apply the mass to the working surface in a distributed manner.

It can then be provided that the mass is applied to the working surface as a pivot movement of the application unit is being performed. The application unit can thereby, with the aid of a motor-controlled drive for example, in particular a servo drive, be pivoted about a pivot axis oriented approximately vertically or perpendicularly to a longitudinal direction of the working surface, and the mass can be applied to the working surface at the same time. There thus results an oscillating movement of the application unit between both application boundaries, during which movement the mass can be continuously, and in particular directly, applied to the working surface.

In order to achieve a particularly uniform layer thickness at the application boundaries, it is preferably provided that a deflection speed of the application unit is regulated by the motor-controlled drive such that a holding time of the application unit at the reversal points is reduced. Additionally, a deflection speed near the reversal points can be increased by the motor-controlled drive, whereby a more uniform application across the envisaged application width of the mass can be achieved.

In addition, the mass applied in a planar manner to the working surface is divided, so that the shape of the piece goods obtained does not need to correspond to the application shape of the mass on the working surface. At least one shaping unit for dividing the mass is thereby used, so that the size of the piece goods can be adapted to the future field of use. Thus, marked variations in shape and size can occur in accordance with the designated field of use for the piece goods.

Furthermore, it is provided according to the invention that the mass is heated to a temperature below the glass transition temperature, for example to 100° C. to 500° C. A controlled evaporation of the water contained in the mass is thereby preferably effected with the use of at least one heating device, whereby the water glass increasingly gels and, after a certain duration of the thermal treatment, even completely solidifies. As a result, the mass is then present as a hardened composite of the starting materials in solid form. Contrary to a mass without binding material, however, the different solid starting materials are bound to one another by the addition of water glass such that a crumbling of the hardened mass is successfully prevented. Accordingly, piece goods of this type can be transported and stored without special precautions. Also, after the hardening of the mass, an additional division can be carried out using an appropriately embodied shaping unit, wherein the mass is broken with an application of force in order to obtain smaller piece goods. Thus, the type and quantity of the dividing steps are decisive for the number of piece goods that can be obtained from a given amount of mass.

Preferably, the mass is composed solely of water glass, glass powder, and, if necessary, water, in order to achieve a beneficial further processing in glass production.

The mass can, in principle, be applied indirectly or directly to the working surface in a planar manner.

It has proven effective that a silicate-based component in powder form, in particular glass powder, is applied to the working surface before the mass is applied to the working surface, so that the powder-form component forms a separating layer between the mass and working surface. A sticking of the mass to the working surface is thus efficiently prevented. Accordingly, the processed mass, or the piece goods, can be easily removed from the working surface without having to fear a destruction of or damage to the piece goods. Also, mass can thus once again be applied to the very same surface without a cleaning of the working surface being necessary in the interim. If a belt conveyor is used, a belt of which can form a movable working surface, for example, a separate unit for applying a powder-form silicate-based component, in particular glass powder, can be provided, which unit ensures a coating of the belt prior to the contact with the mass being processed. Here, a collection unit for re-feeding the glass powder not adhering to the piece goods can be provided at the end of the belt conveyor, so that said glass powder can be recycled within the process.

To form the mass, liquid water glass is advantageously mixed with water and the solid components, wherein the liquid water glass is preferably first diluted with water and then the solid component is admixed. By diluting the water glass, in particular at a ratio of two parts liquid water glass to one to four parts water, the viscosity of the mass can be correspondingly lowered and set as needed. As a result, the portion of solid components can be adjusted such that piece goods with a particularly high portion of solids, in particular glass powder, can be produced. Here, it has proven effective that the portion of solid components is significantly higher than the portion of liquid water glass, wherein in particular a ratio of one part liquid water glass to five to fifteen parts solid components can be provided. Accordingly, the density of the piece goods can be directly influenced by the water portion of the mass, and can be adapted in accordance with the future field of application. Here, it has proven effective to first dilute the already-dissolved water glass before the solid components are admixed to the solution, so that a high homogeneity of the mass is simultaneously achieved with a low expenditure of time. Additionally, the homogeneity of the mass has a direct effect on the nature of the piece goods.

In the case of an inhomogeneous distribution of the solid components in the mass, it can be assumed that water which has evaporated during the thermal treatment will lead to the formation of cavities inside of the piece goods. The density of the piece goods is consequently reduced, whereby transport costs incurred at a constant weight are disadvantageously influenced.

Also, in the addition to a glass melt, the melting process of inhomogeneous piece goods proceeds in a less uniform manner, whereby an increased time requirement on the one hand and a frothing of the glass melt on the other hand can be expected. The aforementioned disadvantages are avoided by the production of homogeneous mass from liquid water glass and at least one silicate-based solid component.

It is expedient if the mass is applied with a layer thickness between 1 cm and 15 cm, preferably between 1 cm and 5 cm, and a width between 50 cm and 250 cm, preferably between 70 cm and 120 cm, to the working surface. By applying the mass with a relatively large width, the quantity of simultaneously produced piece goods can be increased accordingly. In addition, a large range of shapes and sizes of the piece goods produced is permitted, for which reason it is possible to meet individual requirements of the particular field of application. Accordingly, the production of piece goods with the dimensions of a commercially available masonry brick would also be possible.

It has proven effective that the mass is leveled. Here, a shaping unit such as a roller or the like can be embodied such that a particularly flat surface of the mass is created therewith. With the surface thereby created, a subsequent heating of the mass and an evaporation of the water contained in the mass can proceed in a more uniform manner. By contrast, a non-uniform evaporation would have the result that a water vapor forming inside of the mass would escape too slowly due to the different heat distribution in the respective regions of the mass, and bubbles would form in the dough. Similar to the use of an inhomogeneous mass, piece goods produced in this manner usually exhibit cavities in the interior. Accordingly, this disadvantage can be avoided by piece goods with a flat surface, wherein said piece goods are additionally easier to stack, and can therefore be transported in a simpler, more space-saving, and thus more cost-effective manner. The leveling can, for example, take place using a roller arranged above the working surface at a fixed distance from the working surface.

Advantageously, the mass is divided along a longitudinal direction and/or transverse direction. Here, one or more shaping units can be used so that the size and shape of the piece goods can be adjusted as desired. A dividing of the mass in a longitudinal and/or transverse direction can thereby take place both before and after the mass is heated. For example, it can be provided that the dividing of the mass in a longitudinal direction is carried out before the heating and the dividing in a transverse direction is carried out after the heating of the mass. Accordingly, due to the firmer nature of the mass after the heating, a breaking of the mass can also be considered to be a dividing.

A breaking of the mass in a longitudinal and/or transverse direction can take place using a breaking device. In this case, a breaking device of this type can, for example, comprise a driven shaft which can be arranged above or next to the working surface, in particular such that it can be rotated about a rotation axis parallel to the transverse direction, wherein on the shaft, breaking elements can be attached and a comb-like counterplate provided, via which counterplate the mass is moved. Here, a transverse direction denotes a direction which lies in a plane of the working surface, or parallel thereto, and is oriented approximately perpendicularly to a process direction, which process direction can also be referred to as a longitudinal direction. A motor-controlled drive of the shaft of the breaking device can thereby be used, with which drive a rotational speed of the shaft, for example, can be adapted to a speed of a conveyor, in particular a belt conveyor, in particular to obtain consistently-sized piece goods even with a changing conveyor speed.

A breaking device of this type is preferably used for dividing or breaking the mass in a longitudinal and transverse direction, so that no further shaping unit is necessary. Particularly preferably, it is provided that the breaking unit is arranged on the device downstream of a heating device in the conveying direction, so that the mass is first heated and then divided into piece goods by means of the breaking device.

Alternatively, the dividing of the mass can occur either before or after the heating, and in multiple directions. Accordingly, the dividing can alternatively also occur diagonally, whereby any polygonal shape can be achieved. In addition, the dividing of the mass can also take place simultaneously in multiple directions, so that time is saved.

It is expedient that the mass is heated to a temperature between 100° C. and 500° C., preferably 200° C. and 400° C., and is thereby hardened. It is thereby ensured, through the use of at least one heating device with an appropriate output, that only a hardening occurs when the mass is heated. This hardening essentially takes place due to the evaporation of the water contained in the mass, wherein the water glass first gels and ultimately fully hardens, so that the remaining components contained in the mass are firmly bonded to one another. Here, depending on the starting materials, care should be taken to avoid an exceeding of the glass transition temperature, since in this case a fusing of the individual components would occur. The result would be piece goods which, during the addition to a melt, would require an especially large amount of energy for a melting process due to the reduced surface area. Conversely, the piece goods that have merely been hardened as provided offer the advantage of requiring a particularly small amount of melting energy. Thus, when they are used, a much more minor cooling of the melt at an addition site is achieved. This effect results from the nature of the piece goods, which are composed solely of silicate-based solid components bonded by water glass, wherein said solid components are characterized by essentially round grains with a correspondingly large surface area and thus create more contact area for the melt.

Advantageously, piece goods, which can also be referred to as pellets, can be produced with a length between 10 cm and 50 cm, a width between 5 cm and 25 cm, and a height between 1 cm and 15 cm. As a result, a versatile application can be guaranteed, and the dimensions of the piece goods can be adapted to the designated use purpose. There is also the result that the use of piece goods with dimensions adapted in terms of the process leads to a time savings for the feed and the melting time, whereby an efficient operation of the most widely varying plants for glass production is enabled. Whereas small plants for melting down glass raw materials are preferably fed with small piece goods due to the time-saving melting characteristics, piece goods with larger dimensions can be processed in large industrial plants for the production of float glass, hollow glass, or glass tubes.

In a method for producing glass, wherein glass powder is admixed to a glass melt, it has proven effective that the glass powder is first processed into piece goods in a method according to the invention, whereupon the piece goods are admixed to the glass melt. As a result, a frothing of the glass melt, as is common with the addition of glass powders and/or glass granulates, is efficiently prevented. Additionally, an admixture of the piece goods takes place in a particularly simple manner, since a bubble formation or excessive cooling of the glass melt can essentially be avoided due to the melting characteristics of the piece goods described above. A recycling of previously non-reusable glass powder is thus possible in a simple and, at the same time, efficient manner. Preferably, the piece goods admixed to the glass melt solely comprise glass powder, water glass, and possibly water, in order to not introduce impurities into the glass melt.

The second object is attained according to the invention in that, in a device of the type named at the outset, a supply unit is provided with which liquid water glass and at least one silicate-based solid component can be introduced into a mixing unit, wherein the mixing unit is embodied for mixing the liquid water glass and the silicate-based solid component to form a mass, and at least one application unit is provided for applying the mass to a working surface, wherein at least one shaping unit for dividing the mass and at least one heating device for heating the mass are arranged along the working surface. With a device of this type, a method according to the invention can be carried out in a particularly efficient manner.

According to the invention, the advantage results that liquid water glass and at least one silicate-based solid component are introduced into the mixing unit by a corresponding supply unit. The supply unit can thereby be embodied as a reservoir containing liquid water glass, in particular in diluted form with water, and the solid component or, alternatively, as a temporary storage or container containing liquid water glass and the solid component, so that the components of the mass are spatially separated, but can still be stored in the direct vicinity of the mixing unit. Additionally, the supply unit can be embodied such that the dilution of liquid water glass and water can take place directly therein, preferably at a ratio of 4:1 to 1:4 water glass to water. Consequently, a supply unit of this type can also be used to vary the dilution ratio, so that the minimum amount of water glass for setting the desired consistency of the mass can be determined and production costs can be saved. Accordingly, a continuous re-supply of the components to the device is ensured by the supply unit. The supply unit can also comprise a weighing unit which is used to monitor and adjust a ratio of the components introduced into the mixing unit. Here, it is ensured that a composition of the mass is adapted to the particular field of use and can be adjusted such that it remains constant over a longer production period, whereby the piece goods produced exhibit a consistent quality. However, the supply unit can alternatively also be embodied such that the components of the mass are already combined and, if necessary, blended before being introduced into a mixing unit.

In addition, a mixing unit for mixing the liquid water glass and the silicate-based solid component is provided according to the invention, which mixing unit is embodied such that a homogeneous suspension of the solid component in the liquid water glass is obtained. The viscosity of the mass thereby increases proportionally to the portion of solid component, wherein a mixing process is normally intended to obtain a mass with dough-like consistency. In the event that a single mixing process is not sufficient for this purpose, a mixing unit can be composed of multiple mixers having different functional principles, which mixers interact with one another, or through which the mass or the components pass in succession.

Furthermore, the device is typically embodied such that the mass can be conveyed to an application unit and can be applied to a working surface by said application unit. Here, the application unit is embodied such that the mass is compacted in the direction of the working surface and is applied thereto with a most uniform possible layer thickness. In the most beneficial case, the application unit is essentially formed as a funnel with a slot-shaped outlet, wherein an embodiment as a screw conveyor with a nozzle, in particular a wide-slot nozzle, can alternatively also be provided. Furthermore, the application unit can also comprise a sled with a funnel, which sled can be moved along a width of a transport path above a perforated metal sheet or a grate, and which is possibly moved transversely to the transport path by means of a drive, via which sled the mass can be applied to the working surface through the funnel and the perforated metal sheet or the grate, similar to dough in a spaetzle maker.

Alternatively or additionally, the application unit can also be arranged to be directly adjacent to the mixing unit, so that the mass is applied to the working surface directly after mixing. Here, it is advantageous if the application unit is embodied to be pivotable and, with the aid of a motor, can be pivoted about a pivot axis running vertically or perpendicularly to the longitudinal direction of the working surface. A motion can thereby be transmitted from the motor to the application unit such that an oscillating movement of the application unit results, in which movement the deflection speed changes towards a deflection maximum such that an increased mass application at the reversal points is avoided.

The surface is preferably embodied such that a sticking of the mass is prevented. For this purpose, the surface can be embodied as a close-meshed metal netting, though the coating of a metal or plastic surface with a non-stick agent can alternatively also be provided. In addition, in direct proximity to the working surface at least one shaping unit is provided which is embodied for dividing the mass. The mass can thereby be separated into different pieces, whereby the shape of the produced piece goods is defined. Here, the shaping unit can be embodied as a roller, rod, wedge, or plate. To divide an unhardened mass, the shaping unit can be embodied as a cutting roller or rotating knife, wherein an edge or a die can be used to divide a hardened mass. According to a firmness of the hardened mass, the dividing takes place as a breaking or knocking-off. In addition, a heating device for heating the mass is arranged at the working surface, which heating device can typically effect an evaporation of the water contained in the mass. The latter can be achieved in that the heating device heats the mass to a certain temperature and keeps the temperature constant over a certain span of time. For this purpose, any type of heating device in which the temperature can be regulated can be used, for which reason both electrically operated heating devices and heating devices operated with fossil fuels are suitable for use in a device according to the invention. Here, the mass is heated by means of the heating device to a temperature that lies below the glass transition temperature of the mass, so that a melting of the mass is prevented and the mass is merely hardened, for example to a temperature of 100° C. to 500° C. Accordingly, the heat transfer should take place as uniformly as possible, so that a formation of inhomogeneities in the hardened mass is prevented.

Additionally, the heating device can be embodied such that, for safety reasons and/or for maintenance, it is pivotably mounted and can thus be tilted away from a working position.

Advantageously, the mixing unit is embodied as an active mixer, preferably as a rotor-stator mixer. In this manner, an efficient mixing of liquid water glass and at least one silicate-based solid component can take place even at high viscosities. Depending on the desired density of the piece goods and the resulting viscosity of the mass, an active mixer can be embodied as a mixer known from the prior art. Additionally, different variants of active mixers can be installed consecutively or in a loop, in order to ensure an essentially complete homogenization of the mass.

It has proven effective that the working surface can be moved relative to the application unit. For this purpose, the application unit can be movable, for example. However, it is preferably provided that the application unit is stationary and the working surface is embodied to be movable, preferably as a belt or conveyor belt, in order to be able to continuously convey to a heating device mass applied by means of the application unit. The other units can thus also be statically installed. A movable working surface of this type also facilitates an automated production of the piece goods, so that a continuous process can be carried out. In addition, using a speed of the movable working surface, an interaction with the application unit can be effected, via which interaction the amount of applied mass per area can be modified. For this purpose, an application unit can be embodied such that the layer thickness of the mass is proportional to the speed of the working surface, whereby a thinner layer thickness is obtained with a faster movement of the working surface and vice versa.

Expediently, the working surface is formed by a belt, which is preferably embodied as a wire-mesh belt, of a belt conveyor. This allows a continuous operation with a circulating band or belt, to which band or belt the mass can be applied so that a particularly high production capacity of the device is achieved. In this case, a material for the belt is chosen such that as little mass as possible can stick thereto. For this purpose, a close-meshed wire-mesh belt has proven to be particularly suitable. Said belt can additionally be coated with an anti-stick agent so that the risk of a sticking of the mass is even further reduced. Alternatively, the belt can be embodied as a conventional heat-resistant plastic belt, wherein in this case an anti-stick coating is also considered to be expedient for preventing a sticking of the mass.

It is beneficial if, along a longitudinal direction of the working surface, two application units are provided, wherein a component in powder form can be applied to the working surface using a first application unit and the mass can be applied to the working surface using a second application unit downstream from the first application unit in a longitudinal direction. The first application unit can also be arranged at an end of the working surface, and the second application unit can be arranged such that it is spaced apart from the first application unit in a longitudinal direction of the working surface. By embodying the device with two application units, a silicate-based component in powder form, in particular glass powder, can be applied to the working surface by the first application unit, which component prevents a sticking to the working surface by the mass applied by the second application unit. Here, it is preferably provided that a powder-form component of this type forms a separating layer between the mass and working surface. Thus, with the application of a separating layer, it is possible to omit the coating of the working surface with a further anti-stick agent. For this purpose, it can be provided that a first supply unit is used to feed the silicate-based solid component to the first application unit and a second supply unit is used to feed liquid water glass in a diluted or undiluted state and the silicate-based solid component, and thus essentially the unmixed mass, to the second application unit and/or the mixer. Additionally, the application units can electively be embodied differently or identically, wherein a compacting or uniform layer thickness of the applied powder-form component is not absolutely necessary in order to apply an adequate separating layer to the working surface. In addition, the application unit can also comprise a sled with a funnel, which sled can be moved along a width of a transport path above a perforated metal sheet or a grate, and which is possibly moved transversely to the transport path by means of a drive, so that the mass can, via the sled, be pressed through the funnel and perforated sheet or grate and applied to the working surface.

It is expedient that multiple shaping units for leveling, dividing, and separating-off the mass are arranged along the working surface. A precise shaping of the mass is thus enabled, so that the exact dimensions of the piece goods can be defined. Here, a shaping unit for leveling the mass, in particular a roller, is provided, whereby a particularly smooth surface of the mass can be obtained. In addition, the mass can also be simultaneously compacted by the leveling. The roller used to do so preferably comprises a correspondingly hard surface, in order to prevent a sticking of the mass. In order to efficiently prevent a sticking of the mass, at least one wiper, preferably two wipers lying opposite of one another, is also arranged on the shaping unit for leveling the mass. It has thereby proven effective to position two opposing wipers along a rotational axis of the roller such that they bear against the roller as closely as possible to the surface of the mass. Here, the wipers can be embodied to be wedge-shaped, wherein the tips of the wedges form wiper lips that touch the surface of the leveling roller. A shaping unit for dividing the mass is preferably embodied as a cutting roller or rotating knife, wherein the dividing of the mass in a longitudinal and/or transverse direction can be provided. It has proven effective that a shaping unit of this type is arranged before the heating device in a longitudinal direction of the working surface, so that the dividing can take place before the hardening of the mass. In addition, a shaping unit can also comprise at least one edge, a die, or a breaking element for breaking the hardened mass, preferably in a transverse direction. A shaping unit of this type is primarily arranged after the heating device in a longitudinal direction of the device, or in the process, so that the hardened mass can be broken, in particular knocked off, in a simple manner. It is thereby advantageous if the shaping unit is embodied as a breaking device which comprises one or more breaking elements. Additionally, breaking elements of the breaking device are embodied with a, preferably central, socket for coaxial arrangement on a shaft, such that said breaking elements are in connection with one another. Accordingly, the shaft and breaking elements can be set in rotation by a motor-controlled drive unit. In addition, a comb-like counterplate can be attached parallel to the working surface, which counterplate receives the mass and guides it to the breaking elements. In direct proximity to the breaking elements, the counterplate is embodied with at least one prong, in particular in a comb-like manner with multiple prongs arranged at regular intervals, whereby the mass can be broken both in a longitudinal and in a transverse direction. Here, it has proven effective if the number of breaking elements corresponds to the number of prongs, in particular if the number of breaking elements is one greater or less than the number of prongs, or is equal to the number of prongs. The number of breaking elements or prongs also corresponds directly to the number of piece goods created in a breaking process.

In order to achieve a uniform heating of the mass, at least one heating device is arranged above and/or below the working surface. In this manner, the largest sides of the mass in terms of area are heated and the evaporation of the water contained in the mass is carried out in a time-saving and energy-efficient manner. In a preferred embodiment, heating devices are arranged above and below the working surface in order to ensure a uniform heat input into the mass. The heating devices are thereby embodied to be planar, and are oriented facing the working surface. Alternatively, the heating devices can also be arranged only above or below the working surface, though the treatment time should typically be increased in order to be able to guarantee a complete hardening of the mass. Reducing the treatment time through increased temperatures would be possible in principle, but is considered to be disadvantageous due to the higher probability of inhomogeneities occurring in the mass. In addition, there is the risk of heating the mass above the glass transition temperature with excessively high temperatures, whereby the quality of the piece goods obtained would be drastically reduced.

Advantageously, the heating device is embodied as an infrared, microwave, gas, and/or electric radiator. In this manner, the mass can be directly heated, wherein in the case of the infrared and microwave radiators, air is even excluded as a heat transfer medium and the surface or the interior of the mass is heated directly.

Accordingly, these variants offer the greatest energy efficiency and time efficiency. In addition, a combination of multiple different types of heating devices can also be expedient. Thus, one heating device could heat the surface of the mass with infrared radiation at the start of the treatment step, for example, and residual water remaining in the interior of the mass could then be removed with the aid of microwave energy. Alternatively, an electric radiator can also be used, wherein the mass is steadily heated in a conventional manner and is thereby hardened.

Additional features, advantages, and effects of the invention follow from the exemplary embodiments described below. In the drawings which are thereby referenced:

Figure 1:
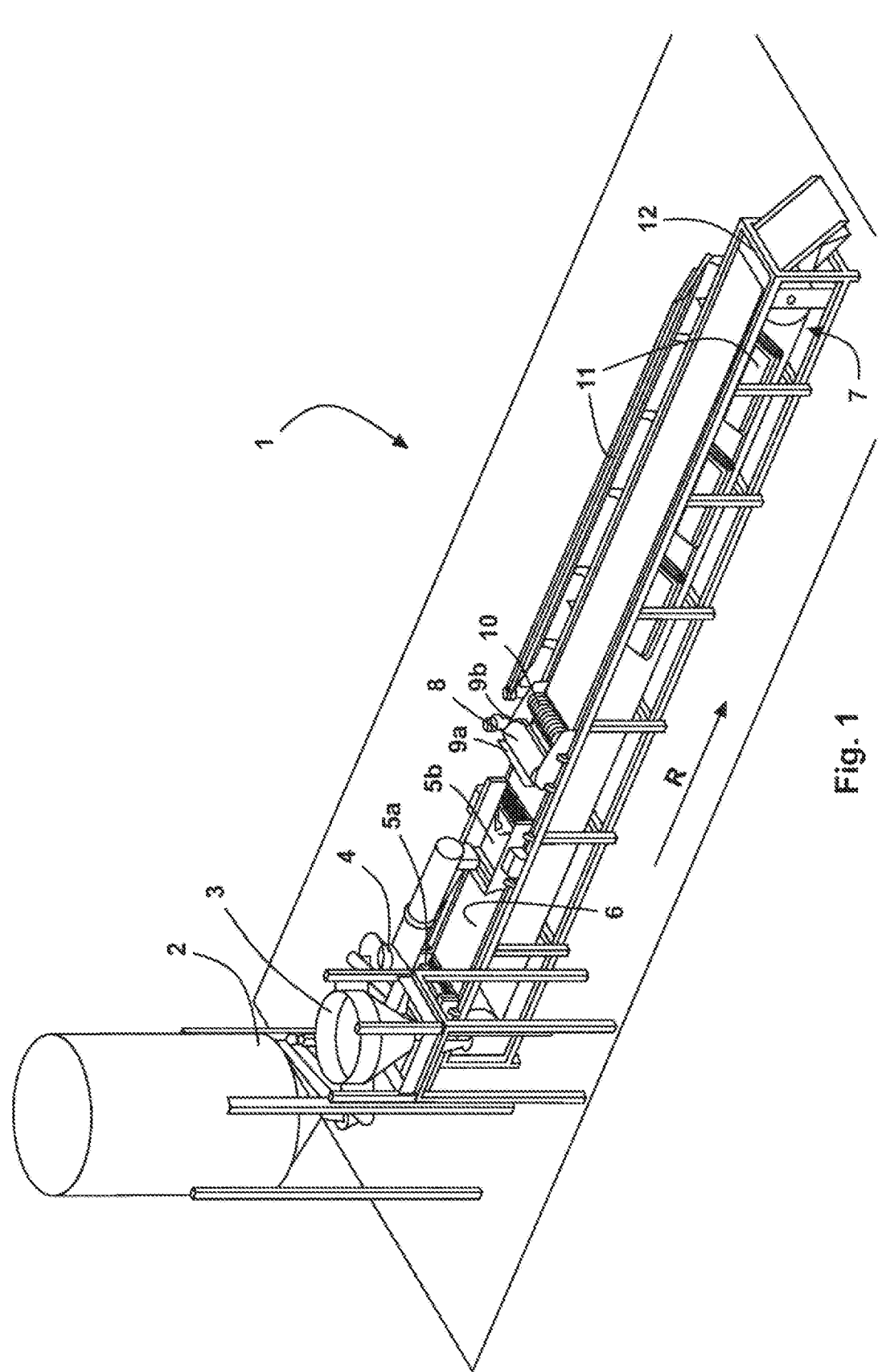
FIG. 1 shows a perspective illustration of a device according to the invention.

FIG. 1 shows a perspective illustration of a device 1 for producing piece goods. If a device of this type is used to produce piece goods made of glass and/or glass-like materials, such as glass powder for example, said goods are referred to as pellets 13 in technical jargon. Here, a supply unit in the form of a reservoir 2 can be seen on the left side of the illustration, which reservoir 2 contains both liquid water glass and at least one silicate-based solid component, which is formed by glass powder in this case.

In addition, the water glass can be diluted with water before being mixed with the glass powder, preferably at a ratio of 4:1 to 1:4 of water glass to water, wherein a dilution of 2:1 is particularly preferred.

This specific embodiment comprises a further supply unit, which is embodied as a weighing unit 3. In said weighing unit 3, water glass, possibly water, and glass powder, which constitute the components of the mass 15, come into contact with one another for the first time. The ratio of the components, in particular of the diluted water glass and the glass powder, is thereby gravimetrically aligned.

Here, a dilution of the water glass can also first take place in the weighing unit 3, so that said weighing unit 3 can adjust not only the ratio between the glass powder and water glass, but also the dilution of the water glass with water.

The components are then introduced into the mixing unit 4, wherein the components are mixed into a homogeneous mass 15. It is thereby preferably provided that an active mixer which operates on the rotor-stator principle is used as the mixing unit 4. A screw conveyor is also provided in the mixing unit 4, in order to convey the mass 15 to an application unit 5*b*.

Here, the application unit 5*b* is equipped with a perforated metal sheet or grate, as well as a sled, for the planar application of the mass 15 to the belt 6, in particular a close-meshed wire-mesh belt, of a belt conveyor 7, wherein the sled presses the mass 15 through the perforated metal sheet or grate such that the mass 15 is applied in a planar manner to the belt 6. The applied mass 15 thereby forms a layer with a width between 50 cm and 250 cm, but preferably 70 cm to 120 cm, and a layer thickness between 1 cm and 15 cm, preferably between 1 cm and 5 cm.

In addition, in the present variant of the device 1, a second application unit 5*a* is provided at the start of the belt 6, which second application unit 5*a* is used to apply the glass powder and is fed from the reservoir 2. Here, the belt 6 is covered with a continuous layer of glass powder, which layer can in particular have a height between 0.1 cm and 2 cm, whereby a separating layer 14 forms between the belt 6 and the mass 15 and a sticking of the mass 15 to the belt 6 is prevented.

The mass 15 applied to the separating layer 14 by the application unit 5*b* is subsequently conveyed by the belt 6 to the first shaping unit. Said shaping unit is embodied as a leveling roller 8 and is used to flatten and distribute the mass 15, wherein the surface of the mass 15 is smoothed. The leveling roller 8 is also embodied such that a sticking of the mass 15 is avoided to the greatest possible extent. In order to completely prevent a sticking of the mass 15, two opposing wipers 9*a*, 9*b* bearing against the surface of the roller and extending along the rotational axis are also provided. The wiper 9*a* is thereby arranged before the leveling roller 8 in a process direction R, so that any mass 15 sticking to the leveling roller 8 is accordingly retained and does not come into contact again with any mass 15. However, in order to prevent that any mass 15 at all sticks to the leveling roller 8, the wiper 9*b* is embodied to be wedge-shaped and is arranged after the leveling roller 8 in the process direction R close to a contact surface of the leveling roller 8 with the mass 15.

In addition, a further shaping unit is provided which is essentially embodied as a cutting roller 10 and divides the mass 15 in a longitudinal direction of the belt 6, and thus in the process direction R. Here, the width of the lines obtained is selected using the spacing of the cutting elements of the cutting roller 10, in order to electively produce larger-sized or smaller-sized pellets 13.

The smoothed mass 15 divided in the process direction R is then heated by a heating device 11 to a temperature below the glass transition temperature, in particular to temperatures between 100° C. and 500° C. For this purpose, heating elements based on infrared technology are used which are arranged above and below the belt 6. The heating device 11 is thereby embodied such that, for safety reasons and/or for maintenance, it is pivotably mounted and can thus be tilted away from a working position. Here, the water contained in the mass 15 is evaporated, whereby the liquid water glass initially gels and eventually hardens. As a result, a hardened mass 15 forms in which the glass powder contained is held together by the dried water glass.

The hardened mass 15 is then broken in a transverse direction by a shaping unit essentially embodied as an edge 12, whereby a final shape of the produced pellets 13 results. In accordance with the application width of the mass 15, the pellets 13 can be produced with a length between 10 cm and 50 cm, a width between 5 cm and 25 cm, and a height between 1 cm and 15 cm. Alternatively, the production of the piece goods can also take place without the division in a longitudinal direction, wherein the entire application width of the mass 15 is maintained so that pellets 13 with a length between 10 cm and 250 cm, a width between 5 cm and 25 cm, and a height between 1 cm and 15 cm are obtained. In an alternative embodiment, a die arranged in a transverse direction can also be provided for breaking the hardened mass 15.

Figure 2:
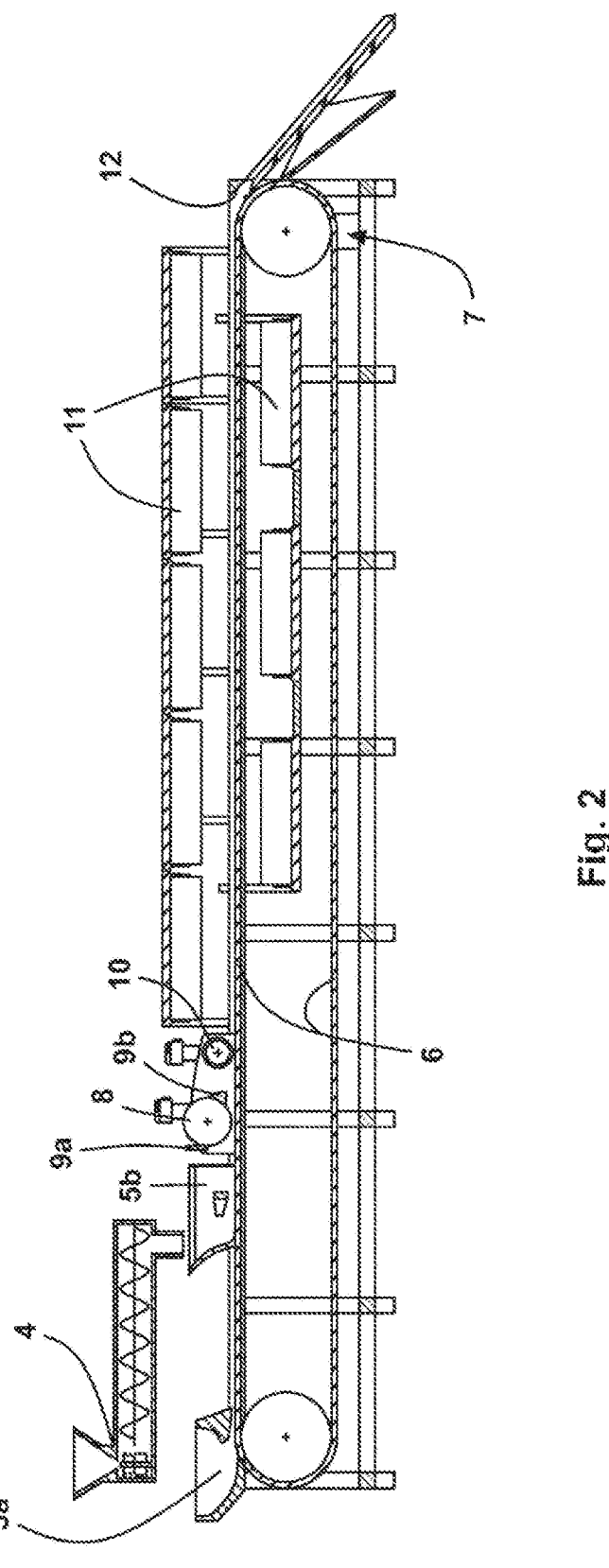
FIG. 2 shows a sectional view of the device from FIG. 1.

FIG. 2 shows a sectional view of the device 1 from FIG. 1. Here, the inner construction of a mixing unit 4 can be seen, wherein said mixing unit 4 comprises a rotor-stator mixer, a screw conveyor, a funnel-shaped inlet, and a vertically oriented outlet. The latter conveys the homogeneously mixed mass 15 of water glass and glass powder into the application unit 5*b*. The additional application unit 5*a* can also be seen at an end of the belt conveyor 7 and belt 6, which forms the working surface, wherein said application unit 5*a* is embodied for the application of glass powder which acts as a separating layer 14 between the belt 6 and the mass 15. Furthermore, the arrangement and shape of the wipers 9*a*, 9*b* that are arranged on the shaping unit embodied as a leveling roller 8 are also discernible. The illustrated shape and arrangement of the wipers 9*a*, 9*b* has proven to be expedient, but the wipers 9*a*, 9*b* could, in an alternative embodiment, be arranged to be closer to the contact point of the leveling roller 8, the point at which the leveling roller 8 touches the surface of the mass 15. Said wipers 9*a*, 9*b* could also be embodied to be wedge-shaped, wherein the tips of the wedges form wiper lips that touch the surface of the leveling roller 8. In addition, the tiltable arrangement of the heating device 11 above and below the belt 6 can clearly be seen. The shaping unit arranged after the heating device 11 is also depicted, which shaping unit is embodied as a beveled edge 12 in this variant. Hardened mass 15 striking the edge 12 is broken in a transverse direction to the process direction R such that pellets 13 are formed as a result.

Figure 3:
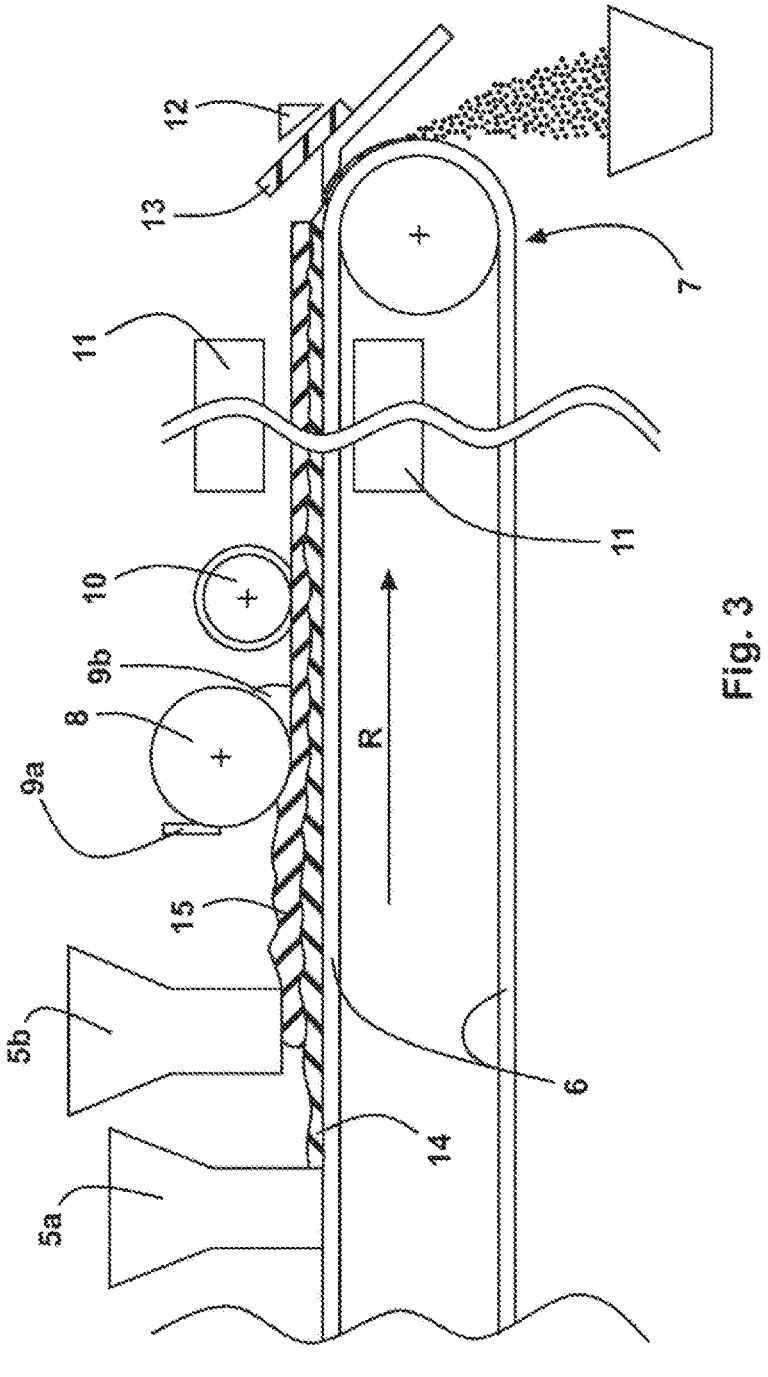
FIG. 3 shows a schematic illustration of a method according to the invention.

FIG. 3 shows a schematic illustration of a method according to the invention. A separating layer 14, which is formed by glass powder in this case, is thereby applied to the belt 6 of the belt conveyor 7 by the application unit 5*a* so that a sticking of the mass 15 to the belt 6 is prevented. The application unit 5*b* then applies the mass 15 to the separating layer 14, wherein irregularities at the surface of thereof and thus a varying layer thickness of the mass 15 can occur, however.

The leveling roller 8 is therefore used in order to smooth the surface of the mass 15 and ensure a uniform layer thickness. In order to prevent a sticking of the mass 15 to the leveling roller 8, the wiper 9*b* is arranged after the leveling roller 8 in the process direction R. If mass 15 should nevertheless stick to the leveling roller 8, the wiper 9*a* is provided in order to remove any adhering mass 15 from the leveling roller 8, so that said mass 15 is not brought into contact again with any mass 15 and, consequently, a uniform layer thickness is obtained through the leveling process.

In the process direction R, a further shaping step follows the leveling process, in which shaping step the mass 15 is divided by the cutting roller 10 in the process direction R. and therefore along the longitudinal direction of the mass 15, so that the mass 15 is then further processed as a plurality of strips. Here, one or more cutting elements can be arranged on the cutting roller 10, so that the width of the strips can vary between 10 cm and 250 cm depending on the overall width of the belt 6.

The mass 15 present in strip form is subsequently heated by at least one heating device 11 to a temperature below the glass transition temperature, in particular to temperatures between 100° C. and 500° C., so that water located in the mass 15 is evaporated and the mass 15 is hardened as a result. Accordingly, the water glass contained in the mass 15 hardens and bonds the glass powder particles contained in the mass 15 to one another such that a solid structure forms that is then broken off by the edge 12.

Finally, pellets 13 form from the hardened strips of mass 15, which pellets 13 are identical in length and height to the width and layer thickness of the prior strips and, in terms of width, have dimensions between 5 cm and 25 cm.

Figures 4, 5:
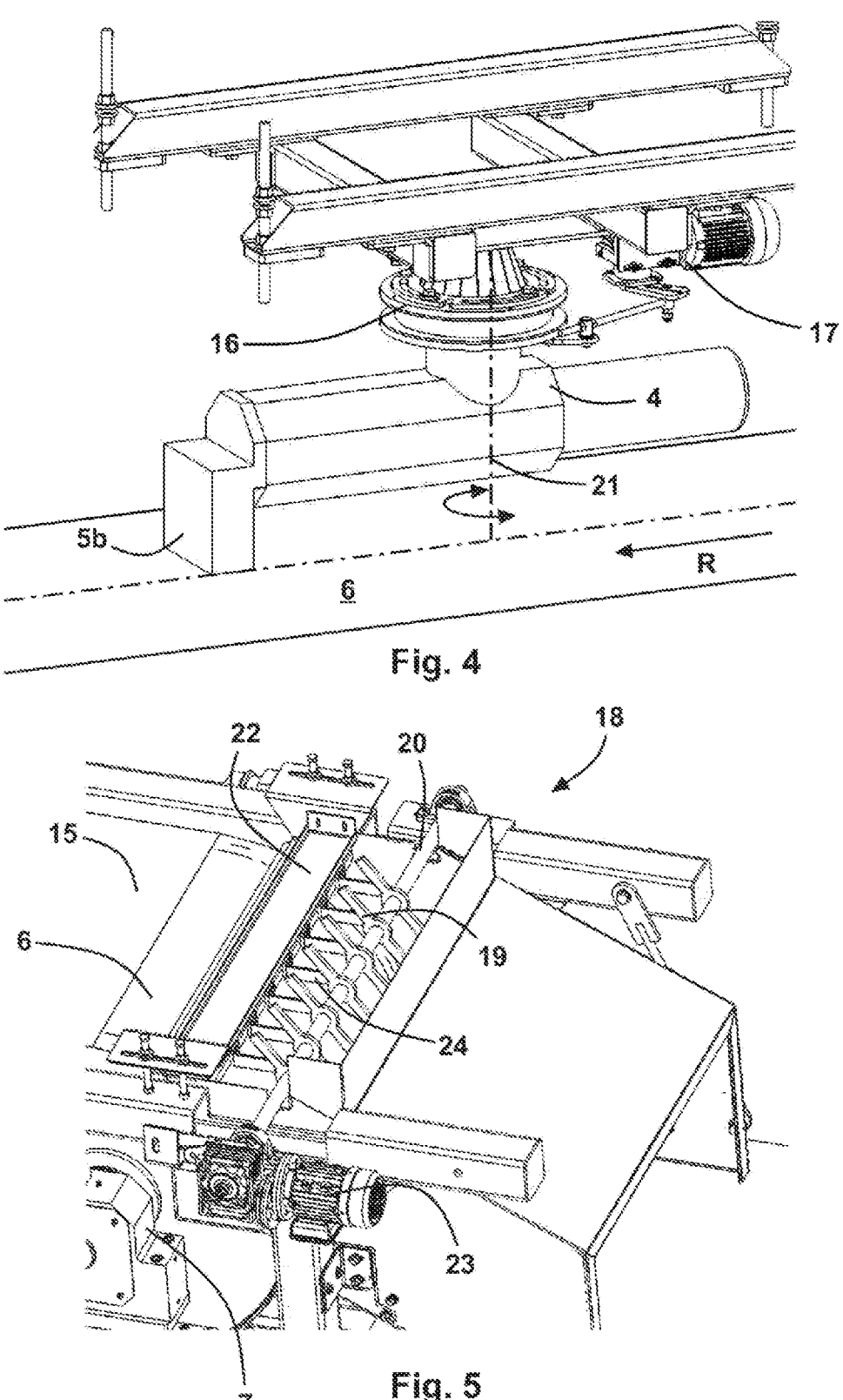
FIG. 4 shows a detailed view of a device according to the invention.
FIG. 5 shows an additional detailed view of a device according to the invention.

In FIG. 4, a perspective illustration of a pivotable application unit 5b is shown, which application unit 5b has been assembled with the mixing unit 4 to form a combined unit and is pivotably attached to a supporting structure via a suspension 16. The application unit 5b is thereby pivotably attached to the supporting structure via the suspension 16, wherein the suspension 16 can also offer the possibility, however, of using the inlet to transfer the components from the weighing unit 3 to the mixing unit 4. Additionally, a motor-controlled drive, which is embodied as a servo drive 17 in this case, is provided via which a pivot movement of the application unit 5b can be controlled.

The inner construction of the mixing unit 4 can be derived from FIG. 2. Here, an application unit 5b is arranged to be directly adjacent to the mixing unit 4 in order to be able to apply the homogeneously mixed mass 15 directly to the belt 6.

The application of the mass 15 to the belt 6 also occurs during the pivot movement generated by the servo drive 17, wherein the application unit 5b is pivoted about a pivot axis 21 positioned vertically on the longitudinal axis of the belt 6 or the process direction R and is set in an oscillating movement. In order to avoid variances of a layer thickness of the mass 15 at the reversal points of the pivot movement, a servo drive 17 can accelerate the pivot movement near the reversal points and avoid any holding time. As a result, a particularly uniform application of the mass 15 directly to the belt 6 can occur, for which reason it is possible to omit a further application unit 5a for applying a separating layer 14.

In FIG. 5, a perspective illustration of a breaking device 18, which is arranged at the end of a belt conveyor 7, is shown that is, is downstream from the heating device 11 in the process direction R. The breaking device 18 thereby replaces the edge 12 for breaking the hardened mass 15 and defines a sizing of the pellets 13. For this purpose, the illustrated breaking device 18 comprises one or more breaking elements 19 for breaking or knocking-off the mass 15. The breaking elements 19 are also connected to one another via a shaft 20 and can be set in motion by a rotation of the shaft 20, which in this case is parallel to the transverse direction. In order to be able to keep the rotation of the shaft 20 constant, a motor-controlled drive 23 is provided.

To ensure that the mass 15 is uniformly caught and broken by each breaking element 19 in a breaking process, a comb-like counterplate 22 is arranged on the breaking device 18. The counterplate 22 thereby receives the mass 15 located on the belt 6 and directly guides it further to the breaking elements 19. The mass 15 is then broken in a longitudinal and transverse direction by the breaking elements 19 via prongs 24 of the counterplate 22, which prongs 24 are arranged in a comb-like manner, and exits the device 1 in the form of pellets 13. In order to break the mass 15 into equally-sized pellets 13, the breaking elements 19 are arranged on the shaft 20, and the prongs 24 on the counterplate 22, at regular intervals. Seven breaking elements 19 are used in the exemplary embodiment illustrated. From the breaking device, the finished pellets 13 fall downwards, where they can easily be collected for further use, for example for admixture to a glass melt.

With a method according to the invention and a corresponding device, it is easily possible simple manner to process glass powder into piece goods or pellets 13, which can subsequently be admixed to a glass melt, so that glass powder that was not previously reprocessable can also be recycled.

The invention claimed is:

1. A method for producing piece goods, comprising:
mixing liquid water glass with at least one silicate-based solid component in powder form to form a mass, applying the mass in a planar manner to a working surface, wherein the working surface is formed by a belt of a belt conveyor, dividing the mass and heating the mass to a temperature below a glass transition temperature so that one or more dimensionally stable pellets are obtained, and
applying the at least one silicate-based solid component to the working surface before the mass is applied to the working surface, so that the silicate-based solid component forms a separating layer between the mass and the working surface.

2. The method according to claim 1, comprising:
diluting the liquid water glass with water and then mixing the diluted liquid water glass and the silicate-base solid component to form the mass.

3. The method according to claim 1, comprising: applying the mass with a layer thickness between 1 cm to 15 cm and a width between 50 cm and 250 cm.

4. The method according to claim 1, comprising: dividing the mass along a longitudinal direction and/or transverse direction.

5. The method according to claim 1, comprising: heating the mass to a temperature between 100° C. and 500° C. to harden the mass.

6. The method according to claim 1, comprising: producing dimensionally stable pellets with a length between 10 cm and 250 cm, a width between 5 cm and 25 cm, and a height between 1 cm and 15 cm.

7. A method for producing glass according to the method of claim 1, comprising: processing glass powder into dimensionally stable pellets and admixing the dimensionally stable pellets to a glass melt.

8. A device for producing piece goods in accordance with the method of claim 1, comprising:
at least one supply unit introducing liquid water glass and the silicate-based solid component into a mixing unit, wherein the mixing unit mixes the liquid water glass and the silicate-based solid component to form a mass;

at least one application unit applying the mass to a working surface, wherein the working surface is a belt of a belt conveyor;

at least one shaping unit for dividing the mass; and at least one heating device for heating the arranged along the working surface, wherein the at least one application unit comprises two application unit provided along a longitudinal direction of the working surface, and the at least one silicate-based solid component can be applied to the working surface using a first one of the two application units and the mass can be applied to the working surface using a second one of the two application units downstream from the first one of the application units in a longitudinal direction.

9. The device according to claim 8, wherein the working surface can be moved relative to the at least one application unit.

10. The device according to claim 8, wherein the belt is a wire-mesh belt.

11. The device according to claim 8, wherein the at least one shaping unit includes multiple shaping units for leveling, dividing, and separating-off the mass arranged along the working surface.

12. The device according to claim 8, further comprising at least one heating device arranged above and/or below the working surface.

13. The device according to claim 8, wherein the at least one heating device is embodied as an infrared, microwave, gas, and/or electric radiator.

* * * * *